No. 616,856. Patented Dec. 27, 1898.
F. H. RICHARDS.
AUTOMATIC WEIGHING MACHINE.
(Application filed Mar. 5, 1898.)

(No Model.) 4 Sheets—Sheet 2.

Witnesses: Inventor:

No. 616,856. Patented Dec. 27, 1898.
F. H. RICHARDS.
AUTOMATIC WEIGHING MACHINE.
(Application filed Mar. 5, 1898.)
(No Model.) 4 Sheets—Sheet 3.

Witnesses:
F. G. Hewitt
Fred. J. Dole

Inventor:
F. H. Richards.

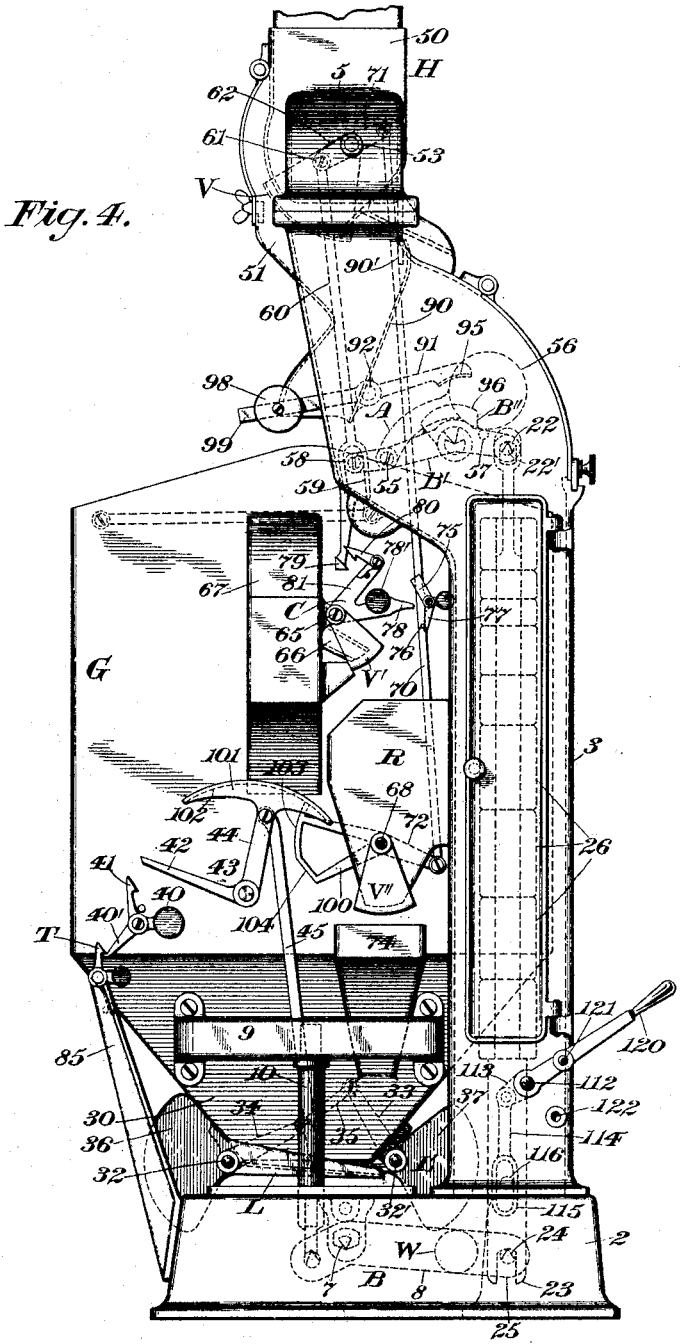

UNITED STATES PATENT OFFICE.

FRANCIS H. RICHARDS, OF HARTFORD, CONNECTICUT.

AUTOMATIC WEIGHING-MACHINE.

SPECIFICATION forming part of Letters Patent No. 616,856, dated December 27, 1898.

Application filed March 5, 1898. Serial No. 672,725. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Automatic Weighing-Machines, of which the following is a specification.

This invention relates to weighing-machines for automatically weighing various kinds of materials.

One of the objects of the invention is to provide, in connection with weighing mechanism, means for frictionally engaging one of the members of the weighing mechanism to retard the operation thereof, said means being normally independent of the weighing mechanism and being thrown into engagement with the beam on the entrance of the supply-stream into the empty load-receiver, by reason of which said load-receiver cannot prematurely descend. In the present case the means for retarding the weighing mechanism is operated by a blade or similar device disposed in the path of the supply-stream and adapted to be shifted by said supply-stream when the stream-controlling valve is opened, so as to secure the advantage specified.

Another object of the invention is to provide, in combination with a load-receiver and beam mechanism therefor carrying counterpoising means for the load-receiver and load, respectively, means for uncoupling the load-counterpoising means from the beam mechanism, said uncoupling means being preferably manually operated, whereby an attendant can, by lifting the load-weight from the beam mechanism, ascertain if the empty load-receiver and the counterpoising means therefor balance. If they do not, as is frequently the case, it is simply necessary to add to or subtract from the counterpoising-weight for the load-receiver to compensate for any variation between the parts.

The machine also includes improved overloading and load-discharging and interlocking stop mechanism, hereinafter more particularly described.

Figure 1:
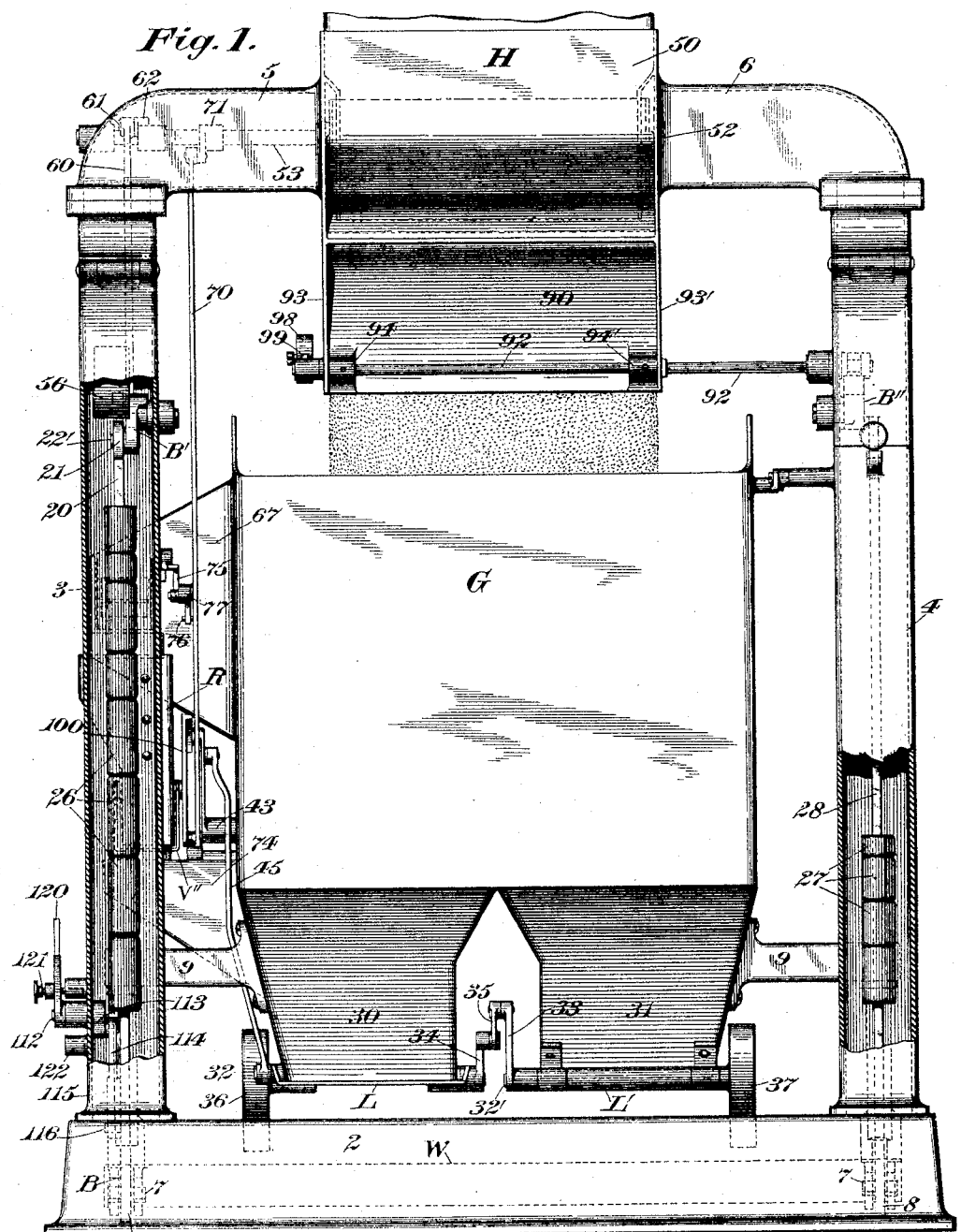
Figure 2:
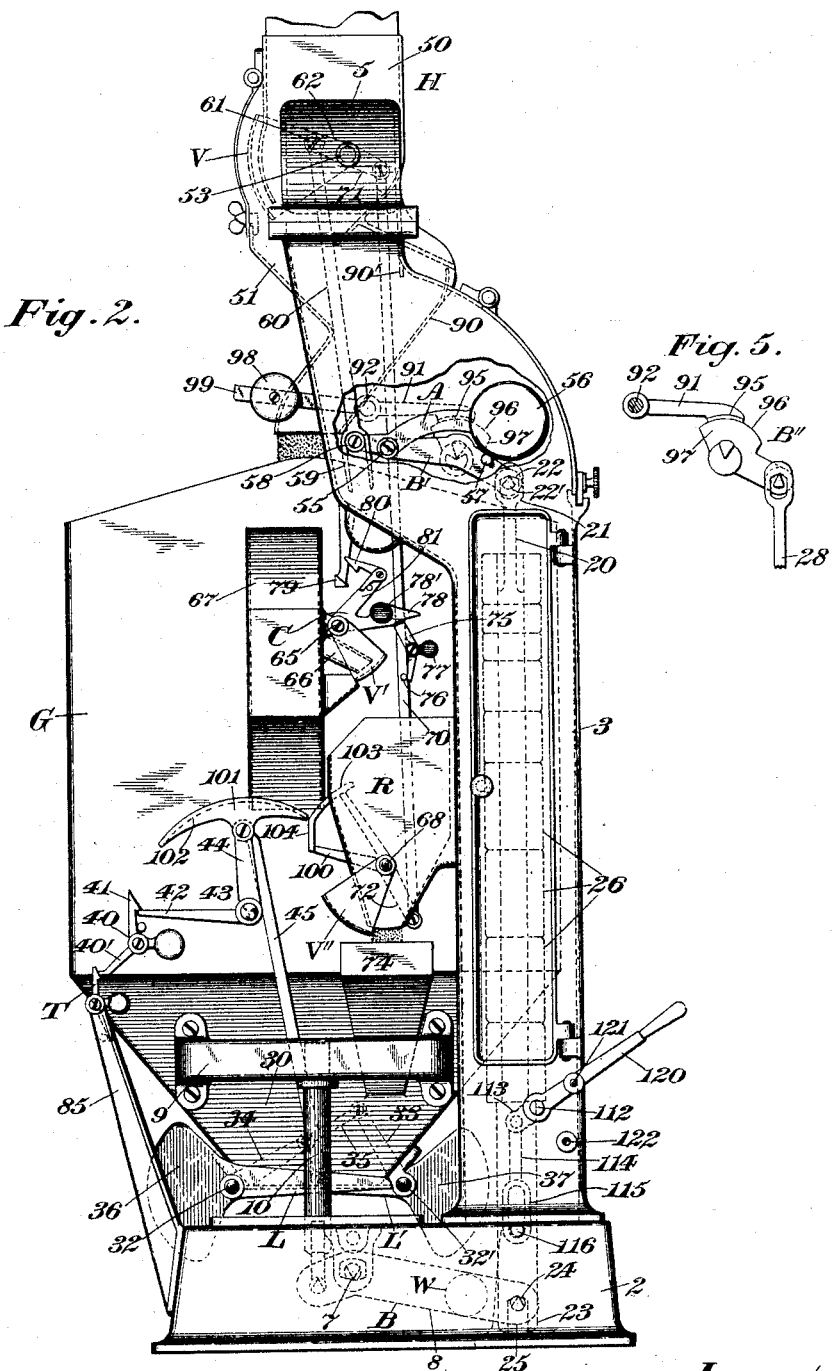
Figure 3:
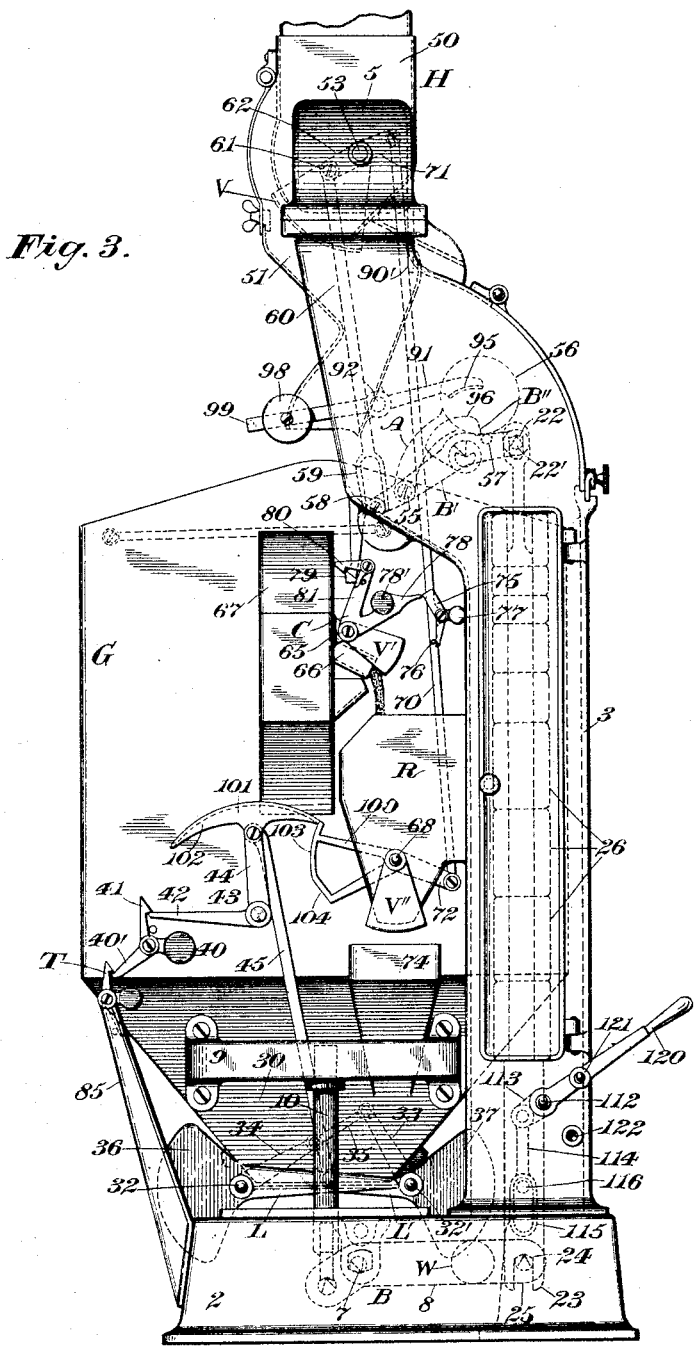

In the drawings accompanying and forming part of this specification, Figure 1 is a rear elevation of my improved weighing-machine. Figs. 2, 3, and 4 are side elevations of the same as seen from the left in Fig. 1, showing the positions occupied by the different parts during the operation of the machine; and Fig. 5 is a detail hereinafter more particularly described.

Similar characters designate like parts in all the figures of the drawings.

The framework for supporting the different parts of the machine consists of the chambered base 2, the hollow columns 3 and 4, resting thereon, and the hollow brackets 5 and 6, extending oppositely from the supply apparatus H, and the beam mechanism is incased in the several members of the framing, thereby to prevent the access of dust, &c., thereto.

The weighing mechanism consists of a load-receiver, as G, and a series of beams, as B, B', and B'', therefor, the load-receiver being suspended upon the beam B, fulcrumed, as at 7, in the base 2 and consisting of a pair of arms, as 8, joined by the cylindrical counterweight W, forming part of the counterpoising means for the load-receiver. The load-receiver is provided at its opposite sides with brackets, as 9, having depending members, as 10, resting upon the poising ends of the beam-arms 8, the mounting of the beam in the base and the load-receiver upon the beam being by the usual knife-edge and notched bearing-joints, and the beams B' and B'' are similarly mounted in the hollow columns 3 and 4, respectively. A rod is shown at 20, having a loop 21 at its upper end, provided with a V-shaped bearing 22, resting on the knife-edge 22' at the outer end of the beam B', said rod being bifurcated at its lower end, as at 23, and resting on the knife-edge 24 on the projection 25, extending rearward from the weight W, the connection of the rod with the two beams permitting the rod to be uncoupled therefrom. The rod carries a series of removable weights, as 26, adapted to balance the load.

In making a test it is desirable to uncouple the load-weights from the beam mechanism, and to carry out this operation the rod 20, upon which the said load-weights are mounted, is raised until it is clear of the two beams, it being understood that during a test the load-receiver is empty. If there is any variation between the load-receiver and its counterpoising means, the counterpoise for the load-receiver can be increased or diminished to secure the proper balance between the parts by adding to or subtracting from the weights 27 on the rod 28, connected at its opposite ends with the beams B'' and beam B, respectively, it being understood that the weights 27 form a part of the counterpoising means for the load-receiver.

It frequently happens in practice that through accumulations of dust on the load-receiver the balance between the same is disturbed, in which case one or more weights can be applied to the suspension-rod 28 to secure an accurate poise. The means for shifting the rod 20 to uncouple it from the beam mechanism will be hereinafter described.

The load-discharging mechanism includes, preferably, a pair of closers, as L and L', respectively, and a latch adapted to engage a member connected with one of the closers, as will hereinafter appear, to hold them shut, said closers being disposed, preferably, side by side and being adapted to cover the openings of the delivery-spouts 30 and 31, respectively, at the lower end of the load-receiver. The closer L is fixed to the shaft 32, supported in bearings upon the under side of the load-receiver, while the closer L' is fixed to a similarly-mounted shaft 32' at the opposite side of the load-receiver, whereby the two closers are caused to oppositely oscillate, and they are also connected for simultaneous operation. The shaft 32' is provided with a crank-arm 33, the other closer-shaft 32 carrying a similar crank-arm 34, and the two arms are connected by the link 35, pivoted to such parts, and the disposition of the crank-arm 34 and the link 35 is such that these parts constitute a toggle, as represented in Fig. 2, thereby to minimize the pressure applied by the closer mechanism to the closer-holding latch.

The means for shutting the closers on the discharge of the load consist of weights, as 36 and 37, respectively secured to the closer-supporting shafts 32 and 32', and said closers are held shut by a latch 40, pivoted to the load-receiver in the ordinary manner and counterweighted to hold the hook 41 in engagement with the arm 42 of the lever 43, pivoted to the load-receiver, the arm 44 of said lever being pivoted to the rod 45, likewise connected at its lower end with the closer L. On the completion of a load the latch 40 is disengaged from the arm 42 of the lever 43, at which time the pressure of the mass in the load-receiver is sufficient to force the two independently-supported closers open simultaneously to effect the discharge of the load.

The supply apparatus H includes a hopper, as 50, communicating with a suitable source of supply, (not shown,) it being adapted to deliver a stream into the chamber 51 below the same, from which the material flows into the load-receiver G, the stream being controlled by a suitable stream controller or valve, as V, one side of which is adapted to receive a pivot, as 52, and the opposite side thereof being provided with the laterally-extending pivot 53, seated in and supported by the walls of the bracket 5. The valve is a gravity one, it being adapted to swing shut or under the outlet of the hopper by its own weight, while the means for opening the valve are preferably connected with the pivot 53.

The valve-opening actuator is designated by A, and it consists of a weighted lever pivoted, as at 55, at the poising end of the beam B', the weight 56 of said lever normally resting on the pin 57 upon the beam, whereby the opposite end of the lever constitutes in effect a fixed extension of the beam. The non-counterweighted end of the actuator is provided with a projection 58, straddled by the bifurcation 59 at the lower end of the rod 60, pivoted, as at 61, to the crank-arm 62 on the pivot 53. The projection 58 descends with the beam from the position shown in Fig. 2 to that illustrated in Fig. 3, and as it does so the valve V is permitted to shut to cut off the supply, this operation being concluded when the load-receiver is overloaded. On the return stroke of the actuator it thrusts the rod 60 upward for opening the valve.

The supply-chute 50 constitutes a convenient means for overloading the load-receiver, the surplus or excess being withdrawn by the operation of load-reducing means preferably involving a valve, as V', pivoted, as at 65, to the short spout 66, extending from the auxiliary chamber 67 on the side of the load-receiver and communicating therewith. The valve V' when opened wide, as shown in Fig. 3, uncovers the outlet of the spout 66 to permit the surplus to pass from the load-receiver G and into the surplus-receiver R, fixed to the upright 3 and provided with a valve V'', pivoted thereto, as at 68, the valve V'' being preferably connected with the main valve V for operation. The rod 70 serves as a connector between the valves V and V'', it being pivoted at its opposite ends to the crank-arms 71 and 72, fixed, respectively, to the valve-pivots 53 and 68, the disposition of the several parts being such that the valves V and V'' are caused simultaneously to shut and open, the valve V'' being adapted to cover the outlet of the surplus-receiver R to hold the surplus temporarily in the latter. The valves V and V'' will be locked against opening movement on the discharge of the load and until the closers L and L' are shut, and when the two closers are latched the two valves will be released, so that the supply-stream can flow into the empty load-receiver from the hopper 50, and the contents of the surplus-receiver R can also gravitate into said load-receiver through the spout 74 on the side of and communicating with said load-receiver.

The actuator for opening the auxiliary or load-reducing valve V' is in the nature of a by-pass device, it consisting of a counterweighted lever 75, pivoted to the rod 70, the lower arm of said actuator being held against the stop 76 on said rod by the weight 77. The actuator 75 is adapted to engage the weighted arm 78 of the lever C during the descent of the load-receiver, thereby to open the load-reducing valve, said valve being held open by a fixed catch, as 79, depending from the column 3, adapted to be engaged by the gravitative latch 80, pivoted to the arm 81 of the lever C.

In Fig. 2 the parts are shown occupying their primary positions, the valves V and V'' being open, while the valve V' is shut. On the descent of the load-receiver and when it is nearly overloaded the valves V and V'' will be closed, the rod 70 being elevated to carry the actuator 75 against the arm 78 of the lever C, thereby lifting said arm 78 and throwing the latch 80 into engagement with the coöperating catch 79, as represented in Fig. 3. The valve V' being open, the surplus will pass from the load-receiver into the surplus-receiver R, and the lightened load-receiver will rise, and when the poising-line is reached, indicating the complete withdrawal of the surplus, the latch 80 will be raised clear of the catch 79, thereby releasing the valve V', so that the weight 78' can promptly shut said valve, and simultaneously therewith the closers L and L' will be released by a by-pass tripper, as T, of the usual construction, pivotally mounted on the riser 85 on the base 2, and the latch-tripper being adapted to engage the arm 40' of the latch on the ascent of the load-receiver, so as to disengage said latch from the arm 42, thereby releasing the two closers.

In connection with the weighing mechanism a brake or retarding device is provided, said device being operable to prevent the premature descent of the load-receiver, and the brake or retarding device is preferably actuated by a blade or plate, as 90, forming a wall of the chamber 51 below the supply-hopper 50, said plate being pivotally supported for reciprocation. The brake is designated by 91, and it consists of an arm fixed to the shaft 92, supported for rocking movement by bearings on the walls 93 and 93' of the chamber 51, said shaft being passed through the ears 94 and 94' on the plate 90 and being secured thereto by pins or other simple means. The free end of the brake or arm 91 terminates in a shoe 95, adapted frictionally to engage the curved surface 96 of the upright offset 97 near the fulcrum of the auxiliary beam B''.

In Fig. 4 the valve is shown shut, the plate 90 being against the overhanging portion 90' of the chute 50, where it is held by the weight 98, adjustably mounted on the arm 99, fixed to the transverse rock-shaft 92, and acting in opposition to the supply-stream, and the brake-shoe 95 is shown at a point above and not in engagement with the offset 97. On the opening of the valve V, which is a rapid operation, the supply-stream will strike the upper side of the plate 90 and will force the same outward, thereby rocking the shaft 92 and carrying the brake-shoe 95 against the beam-offset 97, so that the pressure applied is sufficient to prevent the immediate descent of the load-receiver when the full volume of the supply strikes the closers L and L', respectively. When the valve is closed to reduce the supply materially, the pressure against the plate 90 will be removed to such an extent by the weight 98, which drops and thereby elevates the brake-shoe 95 and consequently frees the beam mechanism, that the load-receiver can freely descend, and the outlet of the chamber 51 being of greater area than the outlet of the hopper 50, as clearly shown in the several side elevations, this operation can be facilitated.

In connection with the valve V'' and the closer mechanism, consisting in the present case of the closers L and L', reciprocally-effective stops are provided, the lever 43 serving as one of said stops, while the other stop is designated by 100 and consists of a skeleton-shaped member fixed to the pivot 68 of the valve V'', the two stops coöperating to prevent the opening of the valves V' and V'' when the closer is open and also the opening of the closers when the valves are open in case the latch 40 should be accidentally tripped. The lever 43 has a segmental head or stop proper, 101, having a flange 102, and the working face of the stop 100 consists of the stop-faces 103 and 104, the first-mentioned being concentric to the axis of the valve, while the face 104 is oblique to the curved face 103. At the commencement of operation, as shown in Fig. 2, the inner end of the stop portion 101 will be adjacent to the oblique face 104, and as the load-receiver descends it will move downward and by the oblique face, which latter at this time is vertically disposed, thereby freely permitting such movement. When the valve V'' is shut, the stop 100 will be swung around and under the flange 102, and it will be apparent that so long as the valve V'' is open the stop 100 serves to block the movement of the stop portion 101. When, however, the valve V'' is shut and the closer is open, as shown in Fig. 4, the stop portion 101 will be swung over the adjacent end of the stop 100, as shown in Fig. 4, carrying the flange 102 thereagainst, so that the opening of the valve V'', and consequently the valve V, is prevented while the closer is open, during which time the load-receiver and the beam mechanism can return to their primary positions; but the actuator A, operative with the valve V, cannot do so, as it is also locked. When the closers shut, the several parts will be released and the actuator A can return to its primary position to open the valves V and V''.

The lifting means for the load-weight-carrying rod 20 may be constructed as follows: A short shaft is illustrated at 112, passing through the outer wall of the column 3, said shaft having on its inside the short rock-arm 113, to which the link 114 is pivoted, said link terminating in a loop 115, embracing the pin 116 near the lower end of the rod 20, by reason of which loose joint the weighing mechanism can freely operate without interference from the rod-lifting means. The rock-shaft carries at its outer end the operating-lever 120, means being provided to hold said lever in its normal and its shifted positions, the set-screw 121 on said lever constituting a convenient means for this purpose and being designed to enter openings, as 122, in the framework. In Fig. 2 the lever is shown occupying its normal or ineffective position. When a test is to be made for the purpose hereinbefore set forth, the set-screw 121 is removed from the opening 122, in which it is located, and the lever 120 is grasped and lowered until the set-screw 121 is opposite the lower opening or aperture 122, when it is thrust into the same, thereby holding the weight-supporting rod 20 in its elevated position, at which time it can be readily ascertained if a true balance exists between the load-receiver and its counterpoising means. After the test the parts are returned to their initial positions.

The load-receiver may be connected with the framework in a manner substantially as shown in Letters Patent No. 589,289, granted to me August 31, 1897, to which reference may be had, and for which reason a detailed description thereof herein is unnecessary.

The operation of the hereinbefore-described machine is as follows: In Fig. 2 the parts are shown occupying their primary positions, the closers L and L' being shut and held by the latch 40, engaging the lever 42, connected with the closers, and the valves V and V'' being open and the valve V' shut, and the surplus from the receiver R being represented passing into the empty load-receiver through the spout 74, and the full volume of the supply-stream being shown flowing from the hopper 50 into said load-receiver. The supply-stream on its entrance into the load-receiver strikes the plate 90 and throws the brake 91 into position to retard the descent of the load-receiver. When a predetermined portion of material has been received by the load-receiver, it, with the several beams, will descend, the actuator A moving therewith and the free end thereof falling away from the rod 60, so that the valves V and V' can be shut. When the load-receiver is overloaded, the valve V' is opened in the manner hereinbefore set forth to permit the surplus to pass from the load-receiver G into the surplus-receiver R, and when the surplus has passed from the load-receiver the valve V' will be released and shut by the weight 78' in the manner hereinbefore set forth, and simultaneously therewith the tripper T will engage the latch 40 and disengage the same from the lever 43, thereby freeing the closers L and L', which are then forced open to effect the discharge of the true load. On the shutting of the closers the several parts are returned to their primary positions to repeat the operation.

Having described my invention, I claim—

1. The combination, with weighing mechanism including a load-receiver, of a device for frictionally engaging one of the members of the weighing mechanism to retard the descent of the load-receiver, and mechanism for throwing said device into an inoperative position before the load is poised.

2. The combination, with weighing mechanism consisting of a load-receiver and beam mechanism, of a device located to frictionally engage the beam to retard the descent of the load-receiver, and means for throwing said device out of operative connection with the beam mechanism before the load is poised.

3. The combination, with weighing mechanism including a load-receiver, of stream-supplying means; and means normally independent of the weighing mechanism, said means being in position to be operated to be thrown into position by the supply-stream to retard the operation of the weighing mechanism before said supply-stream reaches the load-receiver.

4. The combination, with weighing mechanism consisting of a load-receiver and beam mechanism therefor, of means supported independently of the weighing mechanism and adapted to engage one of the members thereof to retard the operation of the same; stream-supplying means for the load-receiver; and a plate situated between the stream-supplying means and the load-receiver, for operating the retarding means.

5. The combination, with weighing mechanism consisting of a load-receiver and beam mechanism therefor, of a supply-chute; a chamber below said chute; a plate movably mounted and forming a wall of the chamber, and adapted to be operated by the supply-stream; and means operative by said plate for retarding the operation of the weighing mechanism.

6. The combination, with a load-receiver, of a series of beams upon one of which the load-receiver is mounted, a counterpoised rod suspended from one beam and resting upon another beam, and means for throwing said weighted rod out of operative connection with both beams.

7. The combination, with a load-receiver, of a series of beams upon one of which the load-receiver is mounted; a weighted rod suspended from one beam and resting upon another; and means independent of the weighing mechanism for lifting said weighted rod off the beam mechanism.

8. The combination, with weighing mechanism including a load-receiver provided with a series of spouts, of a pair of closers facing in opposite directions and connected with the load-receiver, and connections between said closers located between the two spouts.

9. The combination, with weighing mechanism including a load-receiver provided with a series of spouts, of a pair of oppositely-oscillatory closers disposed side by side; and connections between the closers, including a toggle, said connections being located in the space between the spouts.

10. The combination, with weighing mechanism including a load-receiver provided with a closer, of overloading and load-reducing means; a surplus-receiver provided with a valve; a stop connected with said valve and having two faces, one of which is oblique to the other; and a coöperative stop connected with the closer.

11. The combination, with weighing mechanism including a load-receiver provided with a closer, of overloading means; load-reducing means; a surplus-receiver having an oscillating valve; a stop connected with said valve and having two faces, one of which is concentric to the valve, and the other of which is oblique relatively to said first-mentioned face; and a coöperating stop connected with the closer.

12. The combination, with weighing mechanism including a load-receiver provided with a closer, of overloading and load-reducing means; a surplus-receiver provided with a valve; a stop directly carried by said valve; and a lever mounted on the load-receiver and having a stop coöperative with the other stop.

13. The combination, with weighing mechanism including a load-receiver, of overloading means for the load-receiver; load-reducing means involving a valve; means operative with the overloading means for opening said valve; a latch connected with the valve; a catch on the framework, adapted to be engaged by the latch to hold the valve open; and a load-discharger.

14. The combination, with weighing mechanism including a load-receiver, of overloading means for the load-receiver; load-reducing means including a valve; a lever connected with the valve and provided with a latch; a catch on the framework, adapted to be engaged by the latch; means controlled by the overloading means for operating the valve; and a load-discharger.

FRANCIS H. RICHARDS.

Witnesses:
F. N. CHASE,
JOHN O. SEIFERT.